> US012526612B2

(12) United States Patent
Tripathi et al.

(10) Patent No.: US 12,526,612 B2
(45) Date of Patent: Jan. 13, 2026

(54) TECHNIQUES FOR MANAGING CONNECTIONS FOR WIRELESS DEVICES CONFIGURED FOR MULTIPLE SUBSCRIBER IDENTITY MODULE (SIM) ENVIRONMENTS

(71) Applicant: Apple Inc., Cupertino, CA (US)

(72) Inventors: Pranav Tripathi, San Jose, CA (US); Dhiraj J. Shirke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 18/180,765

(22) Filed: Mar. 8, 2023

(65) Prior Publication Data
US 2024/0305960 A1 Sep. 12, 2024

(51) Int. Cl.
*H04W 4/16* (2009.01)
*H04W 68/00* (2009.01)
*H04W 88/06* (2009.01)

(52) U.S. Cl.
CPC .......... *H04W 4/16* (2013.01); *H04W 68/005* (2013.01); *H04W 88/06* (2013.01)

(58) Field of Classification Search
None
See application file for complete search history.

(56) References Cited

U.S. PATENT DOCUMENTS

2008/0139184 A1* 6/2008 Mottes .................. H04M 3/436
   455/414.1
2022/0141720 A1* 5/2022 Jha ........................ H04W 8/183
   455/436

\* cited by examiner

*Primary Examiner* — Frantz Bataille
(74) *Attorney, Agent, or Firm* — DICKINSON WRIGHT RLLP

(57) ABSTRACT

The embodiments set forth techniques for managing connections for wireless devices configured for multiple Subscriber Identity Module (SIM) environments, such as dual SIM, dual standby (DSDS) environments. A common scenario involves a first wireless device receiving a voice call (e.g., using a first SIM of the first wireless device) while carrying out a data call with a second wireless device (e.g., using a second SIM of the first wireless device). In such a scenario, the data call is often disrupted due to the voice call, which can cause confusion to a user of the second wireless device. Accordingly, the techniques disclosed herein include the first wireless device providing, in conjunction with receiving the voice call, a notification of the voice call to the second wireless device. In turn, the second wireless device can inform the user of the event to help mitigate the aforementioned confusion.

20 Claims, 7 Drawing Sheets

TECHNIQUES FOR MANAGING CONNECTIONS FOR WIRELESS DEVICES CONFIGURED FOR MULTIPLE SUBSCRIBER IDENTITY MODULE (SIM) ENVIRONMENTS

FIELD

The described embodiments set forth techniques for managing connections for wireless devices configured for multiple Subscriber Identity Module (SIM) environments, such as dual SIM, dual standby (DSDS) environments.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various devices (e.g., mobile or other wireless devices configured to communicate over one or more types of communication networks) may include two or more Subscriber Identity Modules (SIMs), including physical SIM cards, electronic SIM profiles (eSIM profiles), and the like. Such devices are often referred to as dual/multi-SIM devices. For example, a given device may use a first SIM to communicate over a first network using a first mobile number, first mobile carrier, and so on. The device may also use a second SIM to communicate over a second network using a second mobile number, second carrier, and so on. The first and second SIMs may be used to communicate over the same or different types of networks, using the same or different mobile carriers, using a same mobile carrier but using different mobile numbers, and so on.

In one example, a device may have a dual SIM, dual standby (DSDS) configuration. Under a DSDS configuration, one or both of the SIMs may be configured for a particular function or type of connection. For example, a first SIM may be configured to communicate over a data network, while the second SIM is configured to communicate over a voice network. One or both of the data and voice networks may be provided by the same or different cellular networks. In this example, the first and second SIMs may share a single transceiver of the device. Accordingly, when a voice call is placed or received using one of the SIMs, e.g., the second SIM, any ongoing connection (e.g., a video call using a data connection) over another of the SIMs, e.g., the first SIM, may be interrupted, placed in a standby mode, or the like.

In another example, a device may have a dual SIM, dual active (DSDA) configuration. In a DSDA configuration, the device may include two transceivers. The first SIM and the second SIM may use a respective one of the transceivers. Under this approach, the first SIM and the second SIM may each receive a respective voice call or other type of call (e.g., a video call using a data connection) using a respective one of the transceivers.

SUMMARY

The described embodiments set forth techniques for managing connections for wireless devices configured for multiple Subscriber Identity Module (SIM) environments, such as dual SIM, dual standby (DSDS) environments.

One embodiment sets forth a method for operating a first wireless device configured to utilize a first Subscriber Identity Module (SIM) and a second SIM. The method includes the steps of, at the first wireless device, (1) during a data call between the first wireless device and a second wireless device enabled by the first SIM, receiving notification of an incoming voice call intended to be enabled by the second SIM, (2) receiving an indication that the voice call was accepted, and (3) in response to receiving the indication that the voice call was accepted: (i) generating a notification indicating that the voice call was accepted, and (ii) transmitting the notification to the second wireless device.

Another embodiment sets forth a method for operating a second wireless device. According to some embodiments, the method can be implemented at the second wireless device, and include the steps of (1) during a data call between the second wireless device and a first wireless device, wherein the data call is established on a first Subscriber Identify Module (SIM) of the first wireless device, receiving an indication that a voice call received using a second SIM of the first wireless device was accepted at the first wireless device, and (2) in response to receiving the indication that the voice call was accepted, displaying, on a user interface of the second wireless device, a message indicating that the voice call was accepted at the first wireless device.

Another embodiment includes a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
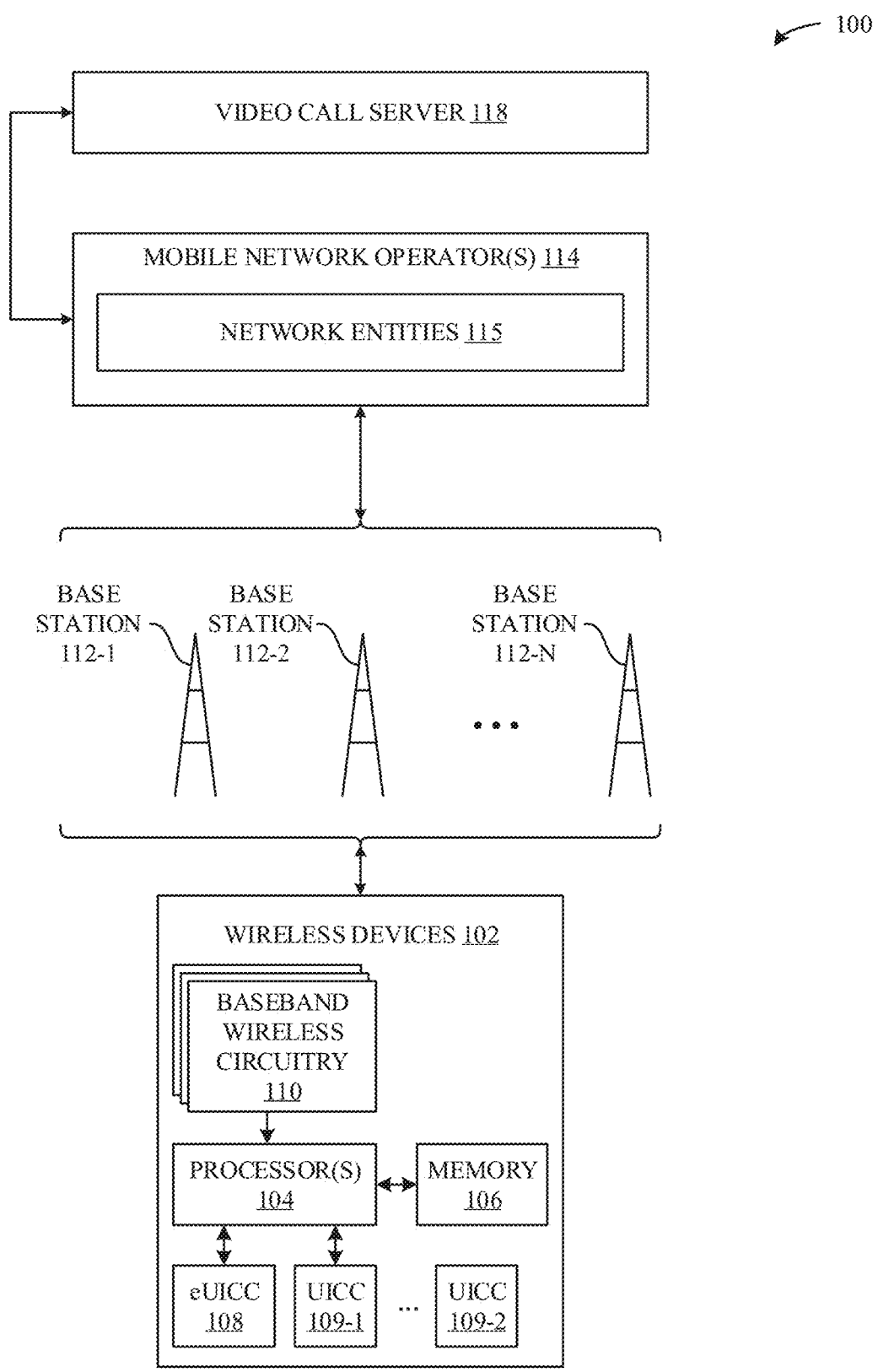
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. As used herein, the phrase "at least one of A and B," whereby A and B are variables indicating a particular object or attribute, indicates a choice of A or B, or both A and B, similar to the phrase "and/or." Where more than two variables are present in such a phrase, this phrase is hereby defined as including only one of the variables, any one of the variables, any combination (or sub-combination) of any of the variables, and all of the variables.

A wireless device that includes two or more Subscriber Identify Modules (SIMs) may operate in a dual SIM configuration, such as a single receiver (SR) dual SIM dual standby (DSDS) or dual SIM dual active (DSDA) configuration. Although the principles of the present disclosure may be implemented by wireless devices operating in other types of dual SIM configurations, a DSDS configuration is primarily described herein for exemplary purposes only.

In a DSDS configuration, a first SIM may be configured (e.g., by a user) to be used for a first type of connection, such as a data connection. For example, the first SIM can be configured as a dedicated data SIM (DDS). Conversely, a second SIM may be configured to be used for a second type of connection, such as a voice connection. For example, the second SIM can be configured as a non-dedicated data SIM (nDDS). Voice calls received via the second SIM may be given priority over ongoing voice/video calls over the data connection (e.g., a video call, such as a FaceTime® call, or a voice call such as a FaceTime audio call, using a data connection associated with the first SIM). Accordingly, when a voice call is received via the second SIM, data activity corresponding to the first SIM—such as an active voice/video call taking place over the data connection associated with the first SIM—may be interrupted or suspended. In some examples, the data connection associated with the first SIM is placed in a standby mode.

In an example where a user of the wireless device (e.g., a first user of a first wireless device) accepts the voice call, a data connection with a user of a mobile device participating in the data activity with the first user (e.g., a second user of a second wireless device. For example, if the first user is on a video call with the second user, accepting the voice call at the first mobile device may terminate the video call. However, the second user may not be aware of the reason for the termination of the video call, or even be aware that the video call has been interrupted. Rather, the interruption of the video call as perceived by the second user may appear to be caused by noise or loss of signal, connection quality, a Real-time Transport Protocol (RTP) timeout, problems with the second mobile device, and the like. In some examples, thirty seconds or longer may elapse prior to the video call being completely terminated, leading to a poor experience for the second user. Furthermore, during a delay between acceptance of the voice call by the first user and termination of the video call, the second mobile device unnecessarily consumes battery power and other device resources.

In embodiments of systems and methods according to the principles of the present disclosure, a notification is provided to a second user (e.g., of a second, MT wireless device) in response to a first user (e.g., of a first, MO wireless device having a DSDS or other dual SIM configuration) receiving/accepting a voice call during a data call or activity (e.g., a video call). In one example, when the first user receives/accepts the voice call, the first wireless device generates and transmits a notification to the second wireless device (e.g., by way of respective data connections that are accessible to the first/second wireless devices). In some examples, the first wireless device transmits the notification only in response to the first user accepting the voice call. In other examples, the first wireless device transmits a first notification that the first user has received the voice call and a second notification that the first user has accepted the voice call. In still other examples, another device or entity external to the first wireless device (e.g., a wireless base station, mobile network operator (MNO) equipment, a video server, and so on) generates and transmits and/or is triggered to transmit a notification to the second wireless device. Although described herein with respect to interruption of an active video call, the principles of the present disclosure may be applied to other forms of activity over any type of connection without departing from the scope of this disclosure.

These and other embodiments are discussed below with reference to FIGS. 1 to 6; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes wireless devices 102 (e.g., a first wireless device 102, a second wireless device 102, and so on), which can also be referred to herein as mobile devices, user equipment (UE), and the like. The system 110 can also include a group of base stations 112-1 to 112-N (referred to collectively as base stations 112) that are managed by different Mobile Network Operators (MNOs) 114, and a video call server 118 that is in communication with the MNOs 114. The MNOs 114 are configured to manage cellular connections (e.g., voice, data, etc.) with the wireless device 102. For example, a given wireless device 102 can initiate and receive voice and data calls over respective cellular networks associated with the MNOs 114.

Each wireless device 102 can represent a mobile computing device (e.g., an iPhone®, an iPad®, an Apple Watch by Apple®, and so on). The base stations 112 can represent cellular wireless network units including evolved NodeBs (eNodeBs or eNBs) and/or next generation NodeBs (gNodeBs or gNB) that are configured to communicate with the wireless devices 102. The MNOs 114 can represent different wireless service providers that provide specific cellular wireless services (e.g., voice, data, SMS, etc.) to which the wireless devices 102 can subscribe, such as via subscription accounts managed by users of the wireless devices 102. According to some embodiments, each MNO 114 can manage and/or be associated with various infrastructure units, including network entities 115 (used in conjunction with the base stations 112 to provide various wireless services offered by the MNO 114) and short message service centers (SMSCs) (used to facilitate transmission of SMS messages). Additional MNO infrastructure entities, such as those used for account management and billing, are not shown.

As shown in FIG. 1, each wireless device 102 can include processing circuitry, which can include one or more processor(s) 104, one or more memories 106, at least one embedded Universal Integrated Circuit Card (eUICC) 108 (configured to implement one or more electronic Subscriber Identity Module profiles (eSIM profiles), as described herein), and at least one baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory.

In some embodiments, the wireless device 102 includes one or more physical UICCs 109, also referred to as SIMs or SIM cards, in addition to or substituting for the eUICC 108. As used herein and below in more detail, a "first SIM" and a "second SIM" may refer to one or more eSIM profiles implemented on the eUICC 108, one or more of the SIMs 109, and so on. Accordingly, the wireless device 102 may be referred to as a dual/multi-SIM wireless device. The components of the wireless device 102 can work together to enable the wireless device 102 to provide useful features to a user of the wireless device 102, such as cellular wireless network access, non-cellular wireless network access, localized computing, location-based services, and Internet connectivity.

According to some embodiments, the eUICC 108 can be configured to store multiple eSIM profiles for accessing cellular wireless services provided by different MNOs 114 by connecting to their respective cellular wireless networks through base stations 112. For example, the eUICC 108 can be configured to store and manage one or more eSIM profiles for one or more MNOs 114 for different subscriptions to which the wireless device 102 is associated. To be able to access services provided by an MNO, an eSIM profile can be reserved for subsequent download and installation to the eUICC 108. In some embodiments, the eUICC 108 obtains one or more eSIM profiles from one or more associated MNO provisioning servers (not illustrated in FIG. 1). The MNO provisioning servers can be maintained by the MNOs 114, an OEM manufacturer, third party entities, and the like. Communication of eSIM profile data between an MNO provisioning server and the eUICC 108 (or between the MNO provisioning server and processing circuitry of the wireless device 102 external to the eUICC 108, e.g., the processor 104) can use a secure communication channel.

According to some embodiments, one or more of the MNOs 114 can be configured to communicate with one or more video call servers, such as the video call server 118. This capability can be achieved using any acceptable approach, e.g., a direct line of communication, an indirect line of communication, and so on, using any communications protocol(s), between the video call server 118 and the MNOs 114. In other embodiments, the video call server 118 can communicate directly with the base stations 112 and/or communicate with the wireless devices 102 via other entities. In other embodiments, the video call server 118 may be implemented by one or more of the MNOs 114.

While voice calls are implemented using the MNOs 114 and associated cellular networks, the video call server 118 can be configured to facilitate video call connections between the wireless devices 102. In this regard, on a given wireless device 102, a first SIM (e.g., eSIM on the eUICC 108, SIM 109, etc.) may be dedicated to data calls/connections (e.g., a DDS). Conversely, a second SIM (e.g., an eSIM on the eUICC 108, a SIM 109, etc.) on the wireless device 102 may be dedicated to voice calls/connections (e.g., an nDDS).

Figure 2:
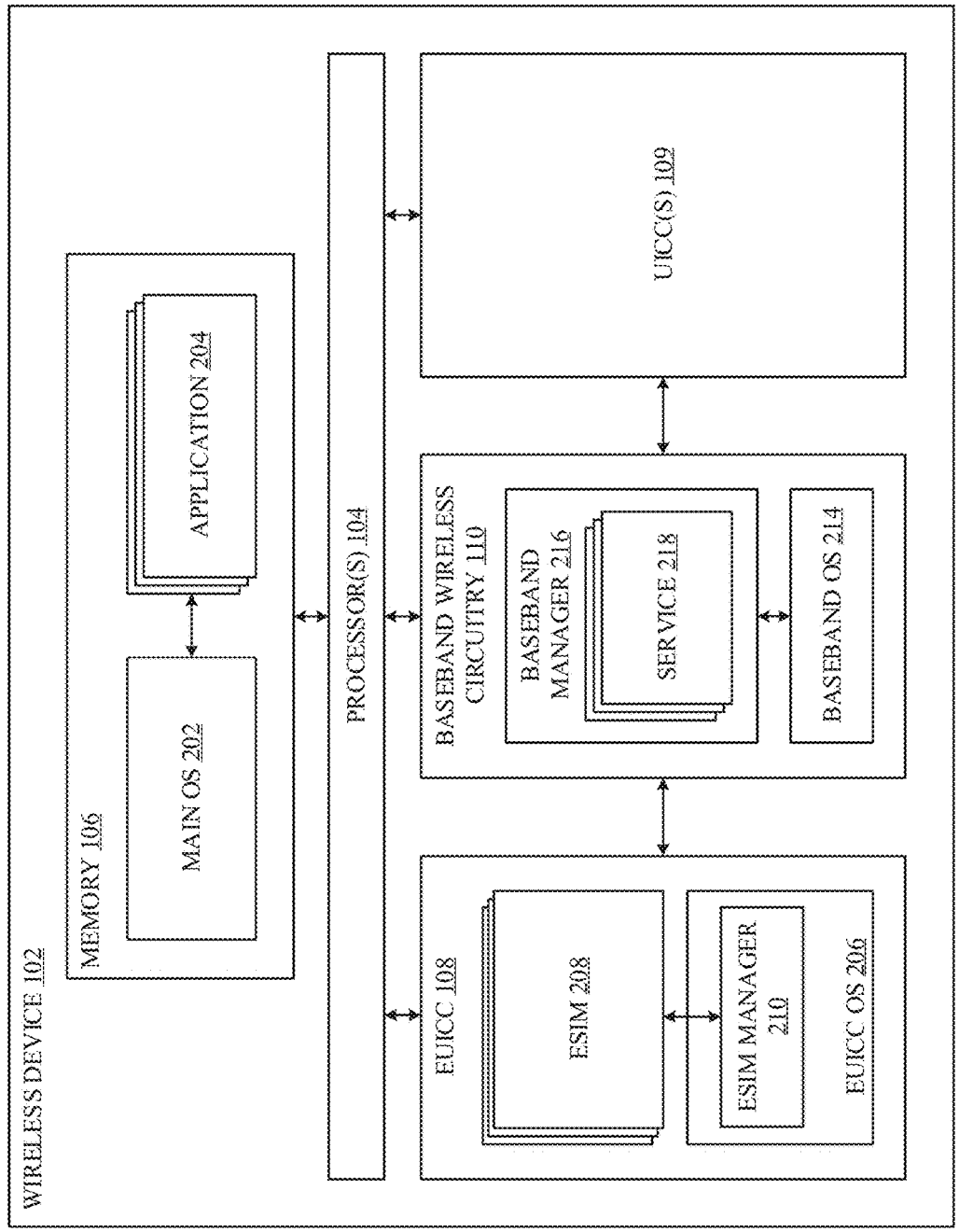
FIG. 2 illustrates a block diagram of a more detailed view of particular components of a wireless device illustrated in FIG. 1, according to some embodiments.

FIG. 2 illustrates a block diagram of a more detailed view 200 of particular components of a wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIM profiles 208 that are stored by the eUICC 108, e.g., by downloading, installing, deleting, enabling, disabling, modifying, or otherwise performing management of the eSIM profiles 208 within the eUICC 108 and to provide baseband wireless circuitry 110 with access to the eSIM profiles 208 to provide access to wireless services for the wireless device 102. The eUICC 108 OS can include an eSIM profile manager 210, which can perform management functions for various eSIM profiles 208. Although not illustrated in FIG. 2, each eSIM profile 208 can also implement one or more applets that, in conjunction with baseband wireless circuitry 110 and the eUICC 108, can enable the wireless device 102 to communicate with an MNO 114 and provide useful features to a user of the wireless device 102.

As also shown in FIG. 2, the baseband wireless circuitry 110 of the wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server and obtain information (such as eSIM profile data) from the MNO provisioning server for purposes of managing eSIM profiles 208. The baseband manager 216 can be configured to implement services 218, which represents a collection of software modules that are instantiated by way of the various applets of enabled eSIM profiles 208 that are included in the eUICC 108. For example, services 218 can be configured to manage different connections between the wireless device 102 and MNOs 114 according to the different eSIM profiles 208 that are enabled within the eUICC 108. The wireless device 102 can further include one or more UICCs 109, as described above in FIG. 1.

In embodiments of systems and methods according to the principles of the present disclosure, the wireless device 102 is configured to provide a notification to another wireless device (not shown in FIG. 2) in response to the wireless device 102 accepting a voice call (e.g., a voice call received via a first SIM) during an activity such as a video call (e.g., a video call using a second SIM). For example, the wireless device 102 can generate and transmit the notification in response to the wireless device 102 receiving or receiving and accepting/answering the voice call. In some examples, the wireless device 102 transmits the notification only in response to the wireless device 102 accepting the voice call. In other examples, the wireless device 102 transmits a first notification that a voice call was received and a second notification that the voice call was accepted by the user.

Although generally described herein as being generated and/or provided by the wireless device 102, any suitable component of the wireless device 102 may be configured to generate, provide, and/or be triggered to provide the notification. For example, any of the first SIM, and the second SIM, the baseband wireless circuitry 110, the processor 104, and so on may be configured to generate the notification. In still other examples, another device or entity external to the wireless device 102 (e.g., one of the base stations 112, the MNOs 114, the video call server 118, etc.) can generate and transmit and/or is triggered to transmit the notification.

Accordingly, FIGS. 1-2 set forth block diagrams of various entities that can be utilized to implement the techniques described herein. A more detailed discussion of these techniques—particularly, the manner in which the various entities of FIGS. 1-2 can work together—will now be discussed below in conjunction with FIGS. 3A, 3B, and 4.

Figure 3A:
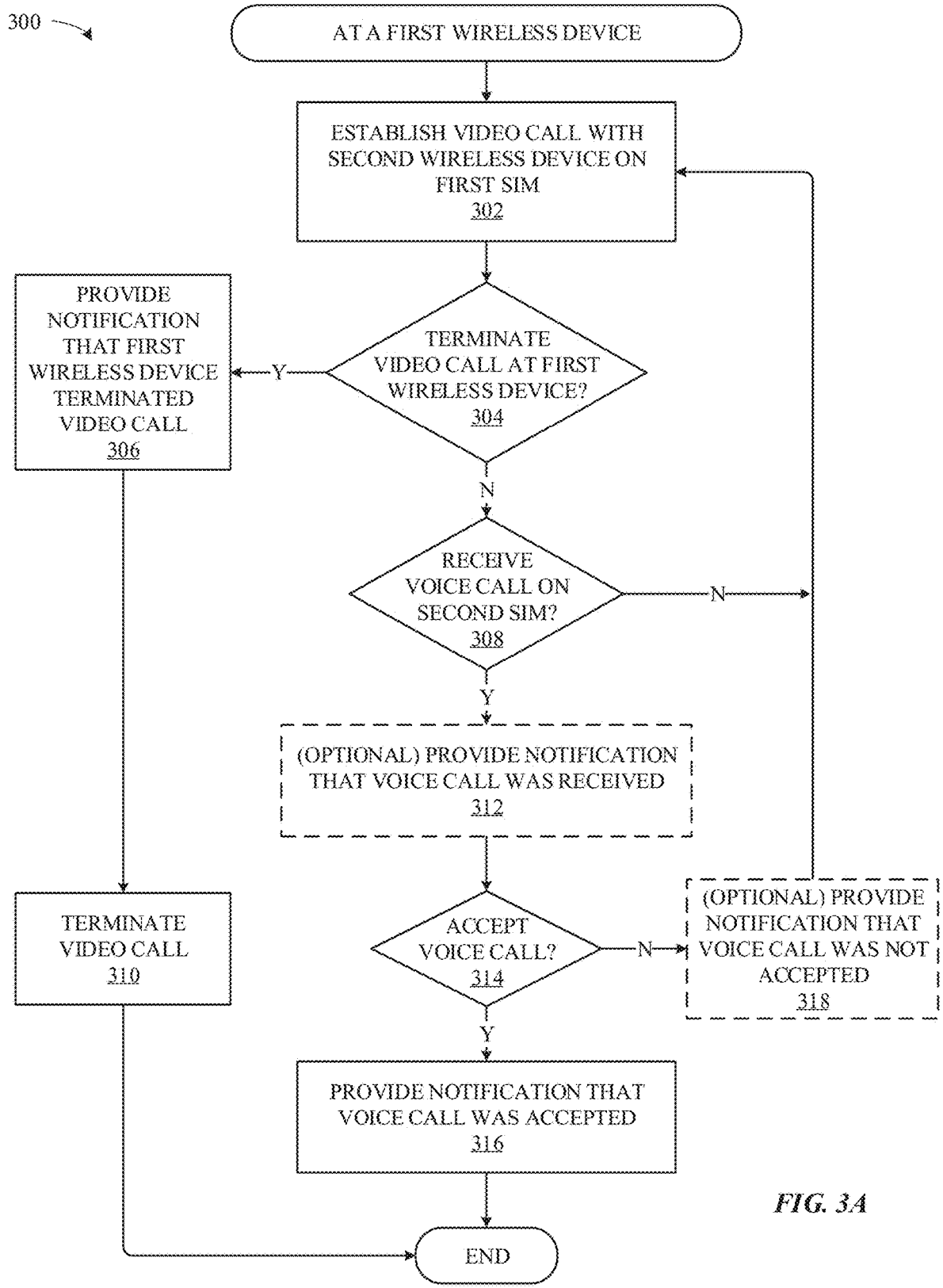
FIG. 3A illustrates a method, implemented by a first wireless device, for providing notifications from the first wireless device to a second wireless device during a video call, according to some embodiments.

FIG. 3A illustrates a method 300 for operating a dual-SIM wireless device that receives a voice call during an ongoing data call, according to some embodiments. In particular, the method 300 involves a first wireless device 102 providing, to a second wireless device 102, information pertaining to a video call held between the devices. As shown in FIG. 3A, the method 300 begins at step 302, where the first wireless device 102 establishes a video call with the second wireless device 102 using a first SIM. In some examples, the first wireless device 102 initiates the video call and is referred to as the mobile originated (MO) device. In other examples, the second wireless device 102 initiates the video call and the first wireless device 102 is the mobile terminated (MT) device.

At step 304, the first wireless device 102 determines whether the video call has been terminated at the first wireless device 102 (e.g., by a first user, a process, etc., associated with the first wireless device 102). The first wireless device 102 may voluntarily terminate the video call for various reasons. If true, then the method 300 continues to step 306. If false, then the method 300 continues to step 308. At step 306, the first wireless device 102 provides a notification to the second wireless device 102 that the video call was terminated. In some embodiments, a user interface of the second wireless device 102 may display a message that the video call was terminated. The first wireless device 102 then terminates the video call at step 310, and the method 300 ends.

At step 308, the first wireless device 102 determines whether a voice call is being received using a second SIM (e.g., a SIM dedicated to voice calls). If true, then the method 300 continues to step 312. If false, then the method 300 continues with the video call at step 302.

At step 312, the first wireless device 102 optionally provides a notification to the second wireless device indicating that the first wireless device 102 is receiving a voice call. In turn, the user interface of the second wireless device may display a message that the first wireless device 102 is receiving the voice call (but, for example, has not yet accepted it). In this manner, the second wireless device is made aware that the first wireless device 102 may potentially accept the voice call and terminate the video call, or that the quality of the video call may be adversely affected as a result of the voice call.

At step 314, the first wireless device 102 determines whether the voice call was accepted. If true, then the method 300 continues to step 316. If false, then the method 300 returns to step 302 (or, optionally, to step 302 via step 318). At step 318, the first wireless device 102 optionally provides a notification to the second wireless device 102 indicating that the first wireless device 102 did not accept the voice call. For example, the user interface of the second wireless device may display a message that the first wireless device 102 is no longer receiving and/or rejected the voice call.

At step 316, the first wireless device 102 provides a notification to the second wireless device 102 that the first wireless device 102 accepted the voice call. In turn, the second wireless device 102 can act on the notification or disregard it. For example, the second wireless device 102 can display, within a user interface associated with the second wireless device 102, information derived from the notification, so that a user of the second wireless device can be informed that the first wireless device 102 accepted the voice call.

Although not shown in FIG. 3A, other conditions, service interruptions, user actions, and so on may occur during the video that may or may not result in a corresponding notification. For example, noise or signal loss, connection quality, RTP timeouts, and so on may cause an interruption, suspension, or loss of quality of the video call. In some examples, the second wireless device 102 may not receive a notification of the cause of the loss of quality (e.g., image jitter, lag, pixilation, freezing, and so on). Accordingly, thirty seconds or longer may elapse prior to the video call being terminated (e.g., by the second wireless device 102), resulting in additional use of battery power and other device resources. In contrast, in response to receiving the notification that the first wireless device 102 accepted the voice call, the second wireless device 102 may be configured to perform one or more actions (e.g., mitigating actions), provide a prompt the user interface to receive an indication of whether to terminate the video call, and so on, as described below in more detail.

Figure 3B:
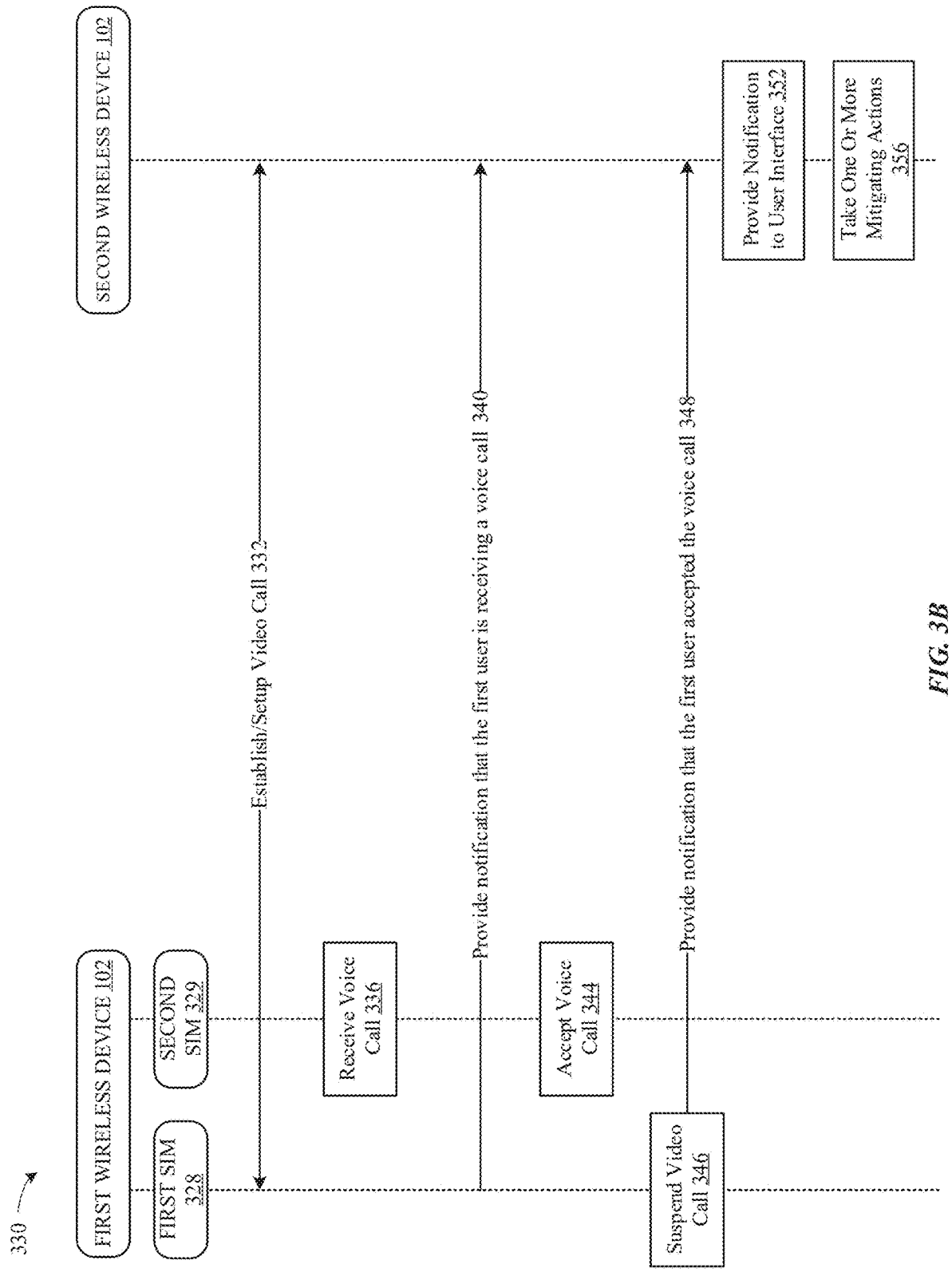
FIG. 3B illustrates a sequence diagram of the manner in which the various entities described in conjunction with FIG. 3A can implement the method of FIG. 3A, according to some embodiments.

FIG. 3B is a sequence diagram 330 illustrating an example manner in which the various entities described above in conjunction with FIG. 3A can implement the method 300, according to some embodiments. As shown in FIG. 3B, the sequence diagram 330 begins at step 332, which includes a first wireless device 102 establishing a video call (or other type of video conferencing connection, gaming session, and so on) with a second wireless device 102 using a first SIM 328 (of the first wireless device 102). Either the first wireless device 102 or a second wireless device 102 may be the MO device while the other is the MT device.

At step 336, the first wireless device 102 receives a voice call via a second SIM 329 (of the first wireless device 102). At step 340, the first wireless device 102 (e.g., via the first SIM 328) optionally provides a notification that the first wireless device 102 is receiving the voice call. The second wireless device 102 may provide a visual indication (e.g., on a user interface associated with the second wireless device 102) that the first wireless device 102 is receiving the voice call.

At step 344, the first wireless device 102 accepts the voice call, which causes the first wireless device 102 (e.g., the first SIM 328) to suspend the video call at step 346. For example, the first wireless device 102 suspends transmitting and receiving of data via the first SIM 328. At step 348, the first wireless device 102 (e.g., via the first SIM 328) provides a notification that the first wireless device 102 accepted the voice call. The notification may be generated and transmitted prior to, concurrently with, and so on, the suspension of the video call at step 346.

At step 352, the second wireless device 102 provides an indication (e.g., visual, audible, tactile, etc.) of the notification. For example, a notification can be displayed on a user interface associated with the second wireless device 102. At step 356, the second wireless device 102 optionally takes one or more mitigating actions (e.g., to avoid unnecessary power consumption, battery use, use of other device resources, to reduce or terminate operations that increase or sustain high operating temperatures, and so on), as described below in more detail.

Figure 4:
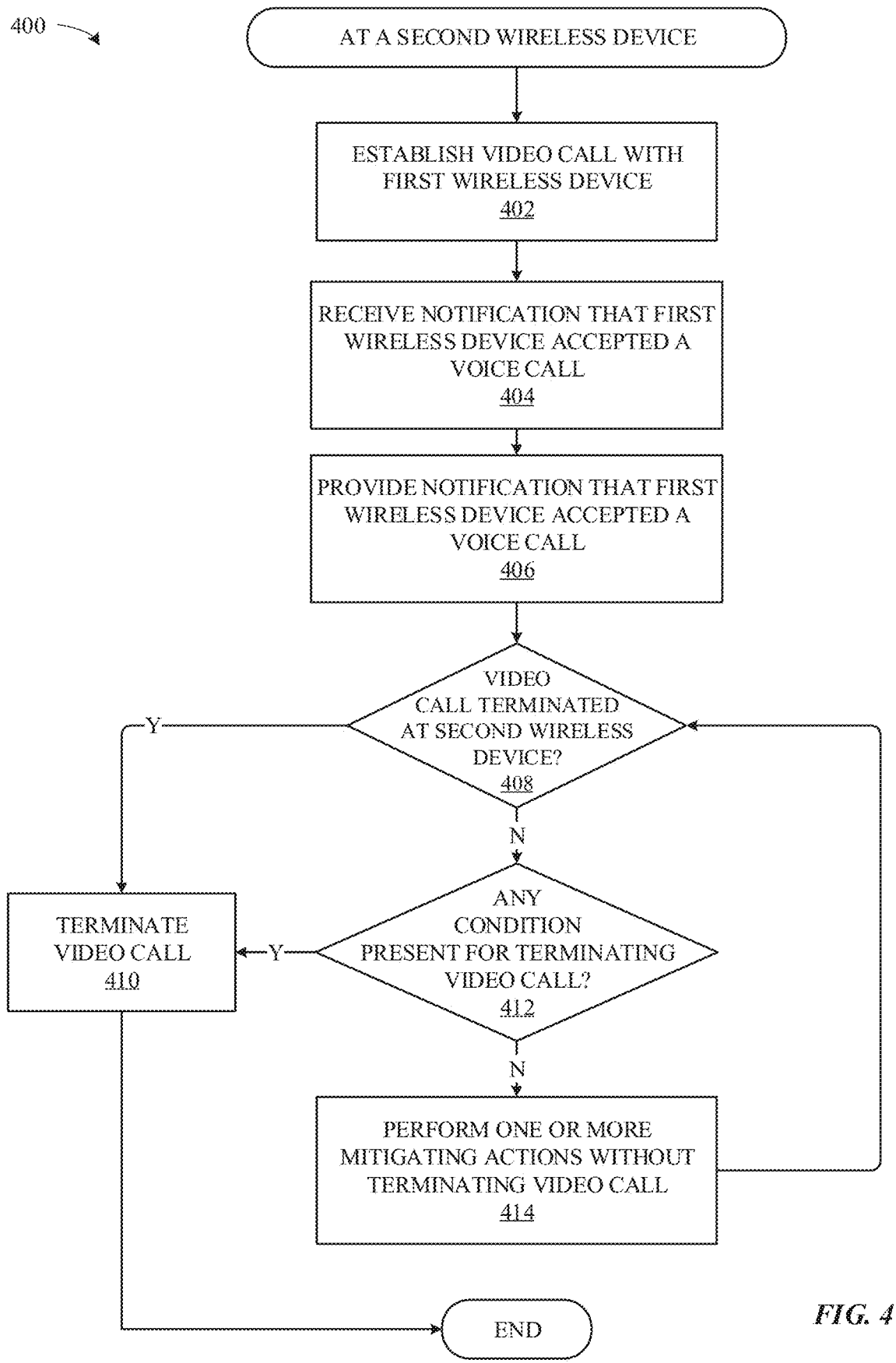
FIG. 4 illustrates a method, implemented by a second wireless device, for operating the second wireless device in response to a first user of the first wireless device accepting a voice call during a video call, according to some embodiments.

FIG. 4 illustrates a method 400 for operating a second wireless device 102 in response to a first wireless device 102 accepting a voice call during a video call according to some embodiments. As shown in FIG. 4, the method 400 begins at step 402, where a video call is established between the first wireless device 102 and the second wireless device 102. In some examples, the first wireless device 102 initiates (i.e., is the MO device) the video call. In other examples, the second wireless device 102 initiates the video call and the first wireless device 102 is the MT device.

At step 404, the second wireless device 102 receives a notification that the first wireless device 102 accepted a voice call. At step 406, the second wireless device 102 provides an indication (e.g., visual, audible, tactile, etc.) of the notification. For example, a notification can be displayed on a user interface associated with the second wireless device 102. In some examples, the visual notification may simply be a message stating that the first wireless device 102 accepted the voice call. In other examples, the visual notification may include a prompt that enables the video call with the first wireless device 102 to be terminated.

At step 408, the second wireless device 102 determines whether the video call was terminated at the second wireless device 102. For example, in response to the notification that the first wireless device 102 accepted the voice call, the video call with the first wireless device 102 may simply be voluntarily terminated (e.g., by the user of the second wireless device 102) at any time subsequent to receiving the notification. If true, then the method 400 continues to step 410. If false, then the method 400 continues to step 412. At step 410, the second wireless device 102 terminates the video call and the method 400 ends.

At step 412, the second wireless device 102 determines whether any other condition for terminating the video call is present. For example, the second wireless device 102 may be configured to automatically terminate the video call in response to receiving the notification at step 404, subsequent to a predetermined delay period after receiving the notification (e.g., after a delay period of five seconds, ten seconds, and so on), an adjustable period, in response to remaining battery power of the second wireless device 102 being below a battery power threshold (e.g., 30%, 40%, 50%, and so on), in response to an operating temperature of the second wireless device 102 being above a temperature threshold, and so on. In other words, the second wireless device 102 may be configured to conditionally terminate the video call at any time prior to an automatic termination of the video call specified by operating protocols of the second wireless device 102 (e.g., such as an RTP timeout). If true, then the method 400 continues to step 410 to terminate the video call. If false, then the method 400 continues to step 414.

At step 414, the second wireless device 102 performs one or more mitigating actions without terminating the video call (e.g., while waiting for the voice call to be terminated at the first wireless device 102 and until the second wireless device 102 terminates the video call in accordance with operating protocols, such as after an RTP timeout). For example, the second wireless device 102 may perform various actions to conserve batter power, reduce operating temperatures, reduce the use of other device resources, and so on. In one example, the second wireless device 102 terminates functions, services, processes, and so on that are not being used due to the suspension of the video call. For example, the second wireless device 102 may terminate data services to conserve battery power. In another example, the second wireless device 102 may dim, fade, or turn off the display of the second wireless device 102. The second wireless device 102 may then continue to determine whether to terminate the video call in steps 408 and 412 (until, for example, the first wireless device 102 terminates the voice call and returns to the video call).

Figure 5:
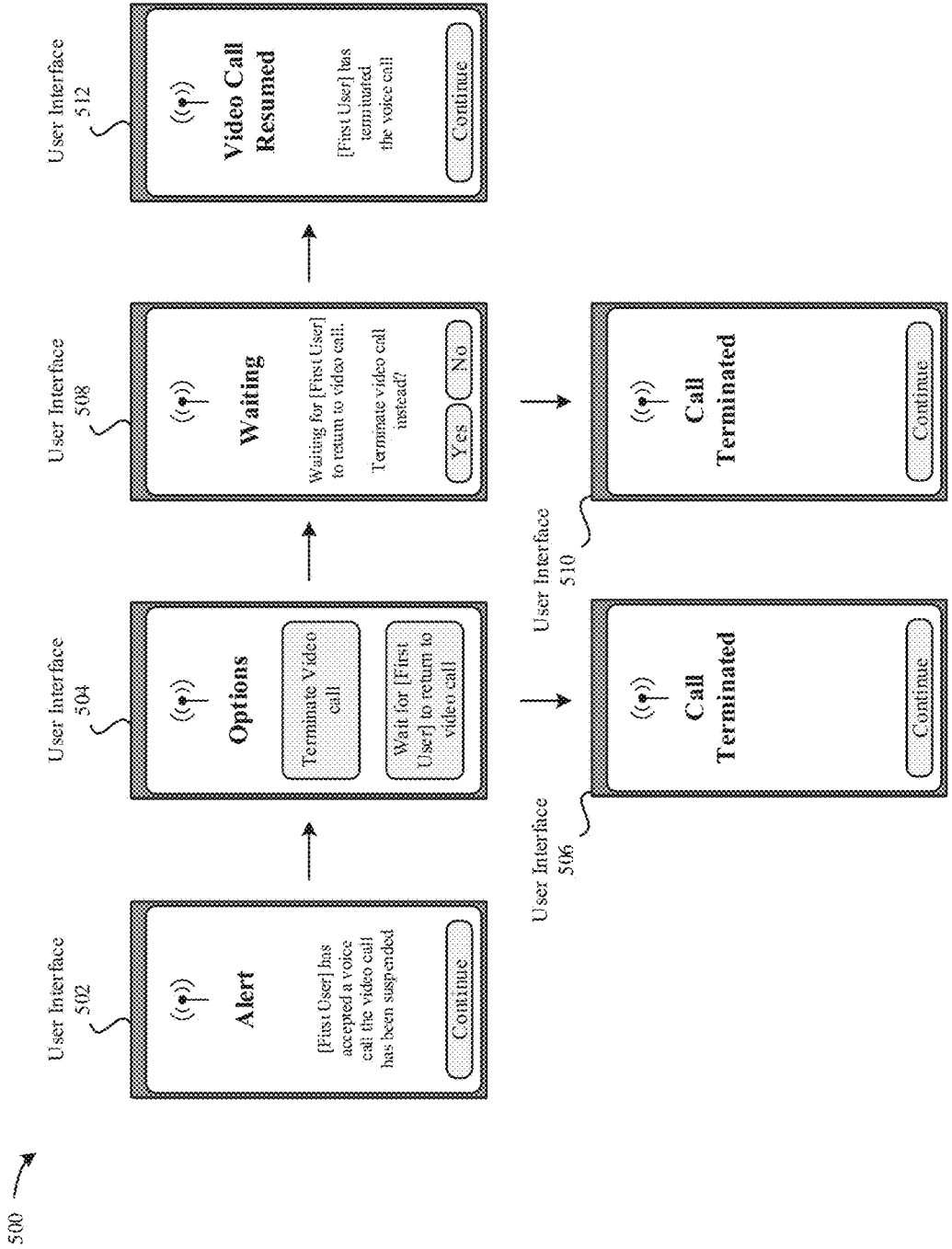
FIG. 5 illustrates user interface flow on the second wireless device in response to receiving the notification that the first user has accepted a voice call, according to some embodiments.

FIG. 5 illustrates conceptual diagrams 500 of user interfaces of a second wireless device 102, according to some embodiments. In particular, the user interfaces can be displayed in conjunction with the second device 102 receiving, from a first wireless device 102 with which the second wireless device 102 is participating in a video call, a notification that the first wireless device 102 has accepted a voice call. As shown in FIG. 5, at 502, during a video call with the first wireless device 102, the second wireless device 102 receives an alert or notification that the first wireless device 102 has accepted a voice call and the video call has been suspended. For example, the second device 334 receives the notification and causes the user interface to display a message indicating that the first wireless device 102 accepted the voice call. Accordingly, the second user is aware that any perceived interruption, loss of quality, and so on in the video is a result of the first wireless device 102 accepting the voice call.

At 504, the second wireless device 102 may display a prompt with optional actions, such as voluntarily terminating the video call or waiting for the first wireless device 102 to return to the video call. In response to "Terminate video call" being selected, the video call is terminated and the second wireless device 102 may continue with other activities as shown at 506. Conversely, in response to selecting "Wait for [First User] to return to video call," the user interface proceeds to 508. At 508, the user interface indicates that the second wireless device 102 is waiting for the first wireless device 102 to return to the video call. While waiting, the user interface may provide a prompt to instead terminate the video call. In this manner, the video call may be terminated at any point while waiting for the return of the first wireless device 102 instead of continuing to wait. In response to "Yes" being selected, the video call is terminated, and the user interface proceeds to 510 (similar to 506).

At 512, the user interface displays a message that the video call is resumed in response to the first wireless device 102 terminating the voice call. The first wireless device 102 and the second wireless device 102 may then continue with the video call. In this example, it is assumed that the second wireless device 102 did not terminate the video call for any other reason (e.g., timeout, power or temperature conditions being met, and so on), as described above prior to the first wireless device 102 terminating the voice call.

Figure 6:
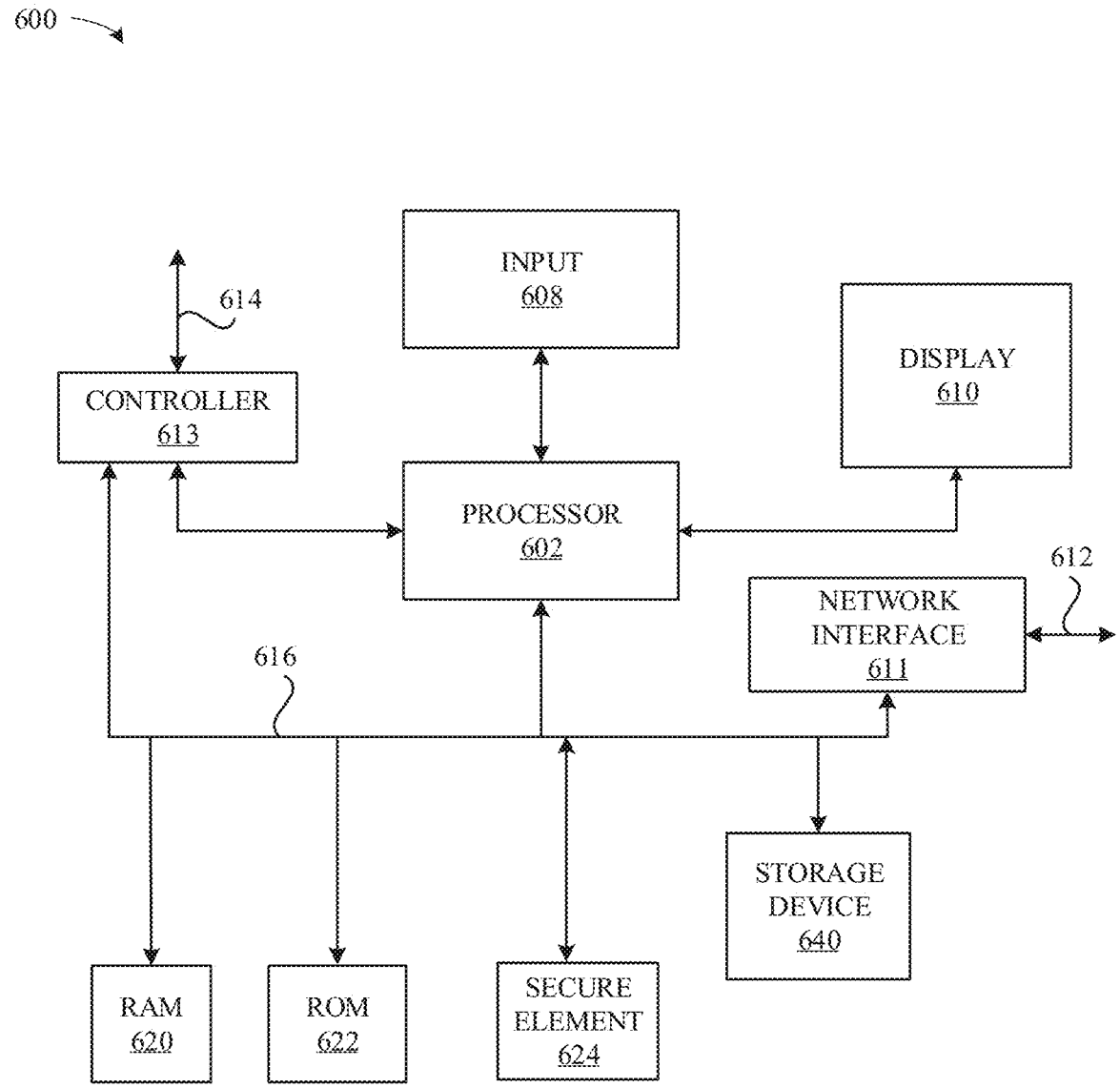
FIG. 6 illustrates a block diagram of exemplary elements of a mobile wireless device, according to some embodiments.

FIG. 6 illustrates a detailed view of a representative computing device 600 that can be used to implement various methods described herein, according to some embodiments. In particular, the detailed view illustrates various components that can be included in a wireless device, such as the first wireless device 102 or the second wireless device 102. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 that can be controlled by the processor 602 to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that communicatively couples to a data link 612. In the case of a wireless connection, the network/bus interface 611 can include a wireless transceiver.

The computing device 600 also includes a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600. The computing device 600 can further include a secure element (SE) 624, such as an eUICC 108 and a UICC 109 (e.g., first and second SIMs, as described herein), or another secure storage for cellular wireless system access by a wireless device 102.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for operating a first wireless device that utilizes a first Subscriber Identity Module (SIM) and a second SIM, the method comprising, at the first wireless device:
   during a video data call via a connection enabled by the first SIM between the first wireless device and a second wireless device, receiving an indication of an incoming voice call intended to be enabled by the second SIM;
   transmitting, to the second wireless device via the connection responsive to receipt of the indication of the incoming voice call, a first notification indicating reception of a voice call by the first wireless device;
   in response to receiving an indication that the voice call was accepted:
      generating a second notification indicating that the voice call was accepted,
      transmitting, to the second wireless device via the connection, the second notification; and
      subsequently suspending the video data call.

2. The method of claim 1, further comprising, prior to receiving the voice call:
   establishing the video data call between the first wireless device and the second wireless device using the first SIM.

3. The method of claim 1, wherein:
   the first wireless device operates in a dual SIM, dual standby (DSDS) configuration,
   the first SIM is configured for data usage,
   the second SIM is configured for voice call usage; and
   the first wireless device comprises a single transceiver shared between the first SIM and the second SIM.

4. The method of claim 1, further comprising:
   in response to receiving an indication that the voice call was not accepted:
      generating a third notification indicating that the voice call was not accepted, and
      transmitting, to the second wireless device via the connection, the third notification.

5. The method of claim 4, wherein the third notification causes the second wireless device to display, on a user interface of the second wireless device, a message indicating that the voice call was not accepted at the first wireless device.

6. The method of claim 1, wherein the second notification causes the second wireless device to display, on a user interface of the second wireless device, a message indicating that the voice call was accepted at the first wireless device.

7. The method of claim 1, further comprising, subsequent to terminating the voice call:
   resuming the video data call with the second wireless device via the connection using the first SIM.

8. A first wireless device that utilizes a first Subscriber Identity Module (SIM) and a second SIM, the first wireless device comprising a processor configured to cause the first wireless device to carry out steps that include:
   during a video data call via a connection enabled by the first SIM between the first wireless device and a second wireless device, receiving an indication of an incoming voice call intended to be enabled by the second SIM;
   transmitting, to the second wireless device via the connection responsive to receipt of the indication of the incoming voice call, a first notification indicating reception of a voice call by the first wireless device;
   in response to receiving an indication that the voice call was accepted:
      generating a second notification indicating that the voice call was accepted,
      transmitting, to the second wireless device via the connection, the second notification; and
      subsequently suspending the video data call.

9. The first wireless device of claim 8, wherein the steps further include, prior to receiving the voice call:
   establishing the video data call between the first wireless device and the second wireless device using the first SIM.

10. The first wireless device of claim 8, wherein:
    the first wireless device operates in a dual SIM, dual standby (DSDS) configuration,
    the first SIM is configured for data usage,
    the second SIM is configured for voice call usage, and
    the first wireless device comprises a single transceiver shared between the first SIM and the second SIM.

11. The first wireless device of claim 8, wherein the steps further include:
    in response to receiving an indication that the voice call was not accepted:
       generating a third notification indicating that the voice call was not accepted, and
       transmitting, to the second wireless device via the connection, the third notification.

12. The first wireless device of claim 11, wherein:
    the third notification causes the second wireless device to display, on a user interface of the second wireless device, a message indicating that the voice call was not accepted at the first wireless device.

13. The first wireless device of claim 8, wherein:
    the second notification causes the second wireless device to display, on a user interface of the second wireless device, a message indicating that the voice call was accepted at the first wireless device.

14. The first wireless device of claim 8, wherein the steps further include, subsequent to terminating the voice call:
    resuming the video data call with the second wireless device via the connection using the first SIM.

15. A method for operating a second wireless device, the method comprising, at the second wireless device during a video data call between the second wireless device and a first wireless device, wherein the video data call is established on a first Subscriber Identify Module (SIM) of the first wireless device:
    receiving a first notification indicating that the first wireless device is receiving but has not yet accepted a voice call via a second SIM of the first wireless device;

in response to receipt of the first notification, displaying, on a user interface of the second wireless device, a first message indicating that the first wireless device is receiving but has not yet accepted the voice call;

receiving a second notification indicating that the voice call received using the second SIM of the first wireless device was accepted at the first wireless device;

in response to receiving the second notification indicating that the voice call was accepted:

displaying, on the user interface of the second wireless device, a second message indicating that the voice call was accepted at the first wireless device; and performing one or more mitigating actions to reduce operations and/or resource usage associated with the video data call to conserve battery power and/or reduce operating temperature of the second wireless device.

16. The method of claim 15, further comprising, in response to receiving the second notification indicating that the voice call was accepted:

terminating the video data call, or suspending the video data call, and subsequently resuming the video data call when the voice call is terminated.

17. The method of claim 15, further comprising, in response to receiving the second notification indicating that the voice call was accepted:

terminating the video data call in response to a determination that at least one of (i) a battery level of the second wireless device equals or falls below a battery threshold, or (ii) a temperature of the second wireless device equals or exceeds a temperature threshold.

18. The method of claim 15, further comprising:

displaying, on the user interface of the second wireless device, an option to terminate the video data call while the video data call is suspended after receipt of the second notification indicating that the voice call was accepted at the first wireless device.

19. The method of claim 15, wherein the second wireless device is configured to automatically terminate the video data call subsequent to a predetermined delay period after receipt of the second notification indicating that the voice call was accepted in response to determination of a requirement to reduce power consumption at the second wireless device to conserve battery resources and/or reduce operating temperature at the second wireless device.

20. The method of claim 19, wherein the predetermined delay period provides for automatic termination of the video data call at any time prior to a transport layer protocol timeout.

* * * * *